(12) United States Patent
Hsu et al.

(10) Patent No.: US 8,424,028 B1
(45) Date of Patent: Apr. 16, 2013

(54) TRAY LOCKING DEVICE OF OPTICAL DISC DRIVE WITH ANTI-SHOCK MECHANISM

(75) Inventors: Cheng-Chung Hsu, Hsinchu (TW); Yung-Han Wu, Hsinchu (TW); Sz-Shian He, Hsinchu (TW); Ming-Chun Tsao, Hsinchu (TW); In-Shuen Lee, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 13/537,047

(22) Filed: Jun. 29, 2012

(30) Foreign Application Priority Data

Apr. 10, 2012 (CN) .......................... 2012 1 0102626

(51) Int. Cl.
*G11B 17/04* (2006.01)
(52) U.S. Cl.
USPC ........................................................ 720/610
(58) Field of Classification Search .................. 720/601, 720/609, 610, 636, 637
See application file for complete search history.

(56) References Cited

U.S. PATENT DOCUMENTS

| | | | |
|---|---|---|---|
| 6,181,663 B1 * | 1/2001 | Kakuta et al. | 720/610 |
| 6,498,774 B2 * | 12/2002 | Kang et al. | 720/610 |
| 6,826,764 B2 * | 11/2004 | Fujisawa | 720/610 |
| 7,073,183 B2 * | 7/2006 | Hekizono | 720/610 |
| 7,386,867 B2 * | 6/2008 | Yang et al. | 720/610 |
| 7,698,715 B2 * | 4/2010 | Kuo et al. | 720/601 |
| 7,725,908 B2 * | 5/2010 | Harada et al. | 720/610 |
| 8,332,879 B2 * | 12/2012 | Matsumoto et al. | 720/610 |
| 2003/0117929 A1 * | 6/2003 | Bae et al. | 369/75.2 |
| 2004/0117807 A1 * | 6/2004 | Takahashi et al. | 720/610 |
| 2005/0066342 A1 * | 3/2005 | Tu | 720/610 |
| 2006/0265722 A1 * | 11/2006 | Yang et al. | 720/610 |
| 2007/0028250 A1 * | 2/2007 | Chien et al. | 720/610 |

* cited by examiner

*Primary Examiner* — Brian Miller
(74) *Attorney, Agent, or Firm* — Jianq Chyun IP Office

(57) ABSTRACT

A tray locking device of an optical disc drive is adapted to lock and release a tray. The optical disc drive has an optical head engaged to a lead screw and driven to be moved by the lead screw. The tray locking device includes: a pushing member, disposed on the optical head; a first stop portion, disposed on the tray; a latching hook, adapted to latch and release a pin; and a transmission assembly, disposed between the pushing member and the latching hook and having a lever element and a weight block, wherein the lever element is movably disposed on the tray and has a second stop portion, and the first stop portion and the second stop portion can be coupled with each other.

8 Claims, 6 Drawing Sheets

TRAY LOCKING DEVICE OF OPTICAL DISC DRIVE WITH ANTI-SHOCK MECHANISM

CROSS-REFERENCE TO RELATED APPLICATION

This application claims the priority benefit of China application serial no. 201210102626.4, filed on Apr. 10, 2012. The entirety of the above-mentioned patent application is hereby incorporated by reference herein and made a part of this specification.

BACKGROUND OF THE INVENTION

1. Field of the Invention

The invention relates to a tray locking device, particularly to a tray locking device of an optical disc drive.

2. Description of Related Art

As computers become more developed, types of information handled by computers also continue to grow, and demand for storage space becomes increasingly higher. Since optical disc s have the advantages of low price, portability, large storage capacity, ease of storing, long storage time, and protection for data from damage, they have gradually replaced traditional magnetic storage media and become an indispensible optical storage medium for people in the modern age. With the rise in popularity of optical discs, optical disc drives that are used to read optical discs have also become an indispensible electronic product in our life.

Generally speaking, an optical disc drive is equipped inside with an optical head, and uses transmission parts such as lead screws to drive the optical head back and forth, which allows the optical head to read an optical disc carried on the tray. Aside from the above-mentioned lead screws and other transmission parts, an optical disc drive also has inside it a tray locking device in order to lock the tray in place, and release and eject the tray from the optical disc drive upon an ejection command, which allows a user to place or retrieve the optical disc.

In conventional optical disc drives, the locking and releasing of a tray are typically controlled by an electromagnetic plunger or a motor. However, disposing too many parts within the optical disc drive takes up space thereof, compromises the potential for the optical disc drive to be light and thin, and increases the production cost.

SUMMARY OF THE INVENTION

The invention provides a tray locking device of an optical disc drive that reduces the amount of optical disc drive parts and saves space inside, thereby efficiently reducing the production cost.

The invention proposes a tray locking device of an optical disc drive adapted to lock and release a tray. The optical disc drive has an optical head, engaged to a lead screw and driven to be moved by the lead screw. The tray locking device includes: a pushing member, disposed on the optical head; a first stop portion, disposed on the tray; a latching hook, used for coupling and releasing a pin; and a transmission assembly disposed between the pushing member and the latching hook, which includes a lever element and a weight block, wherein the lever element is movably disposed on the tray and has a second stop portion, and the first stop portion and the second stop portion can be coupled with each other; wherein when the tray is to be ejected, the pushing member pushes the lever element, and enters a loading segment; wherein when the optical disc drive is subjected to an impact, the weight block pushes the lever element, and makes the first stop portion and the second stop portion coupled with each other.

To make the above-mentioned descriptions and advantages of the invention clear and comprehensible, embodiments and accompanying figures are described in detail in the following.

DESCRIPTION OF EMBODIMENTS

Figure 1:
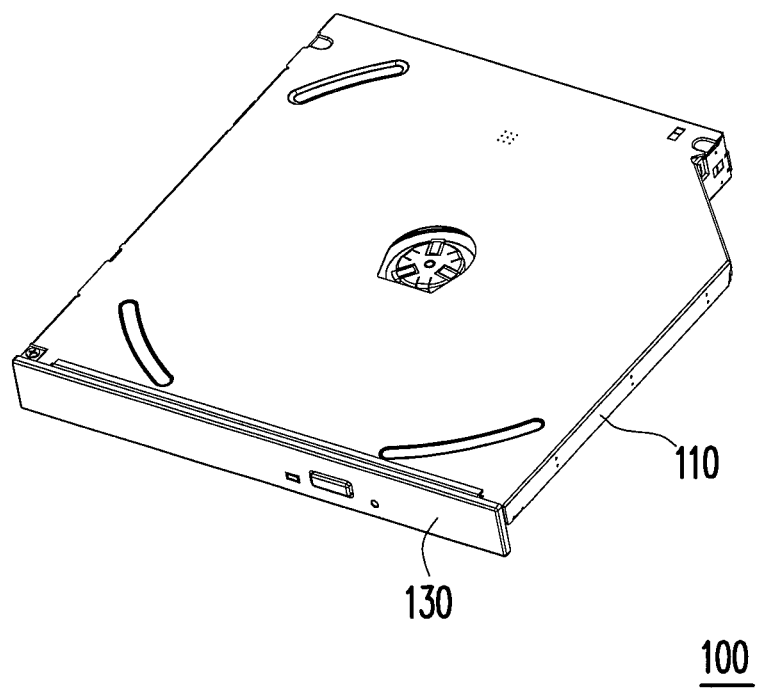
FIG. 1 is a three dimensional view of an optical disc drive of an embodiment of the invention.
Figure 2:
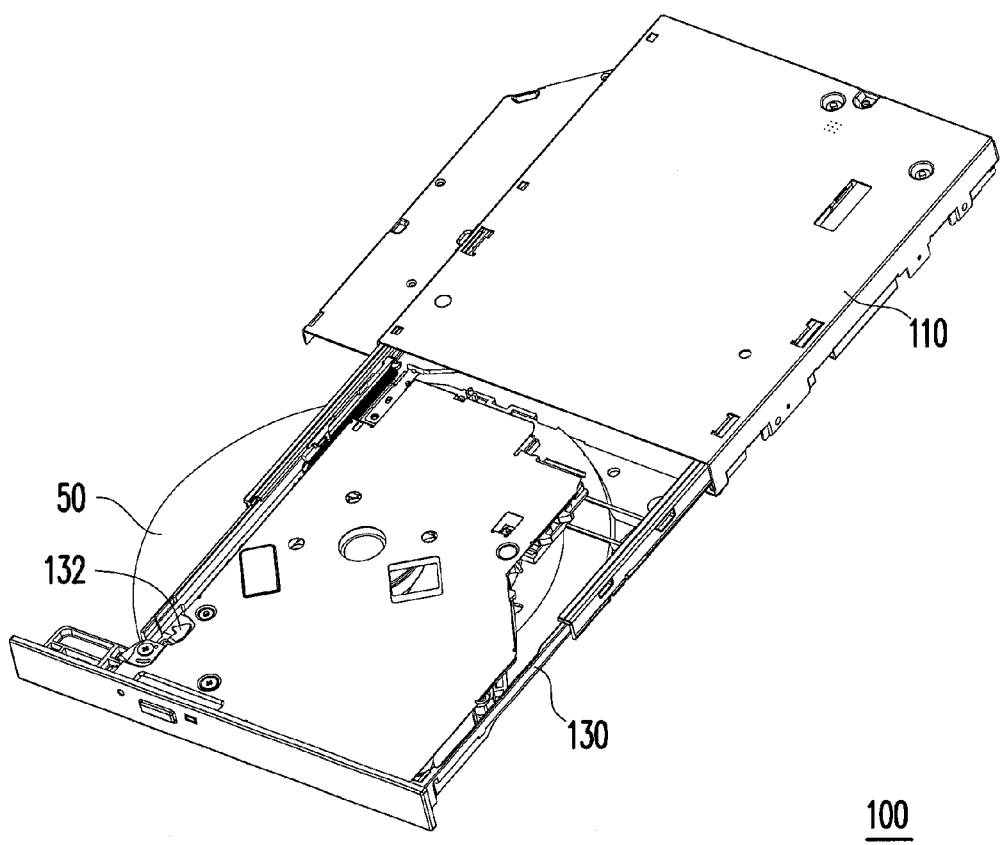
FIG. 2 is a schematic view of a tray ejected from the optical disc drive of FIG. 1.
Figure 3:
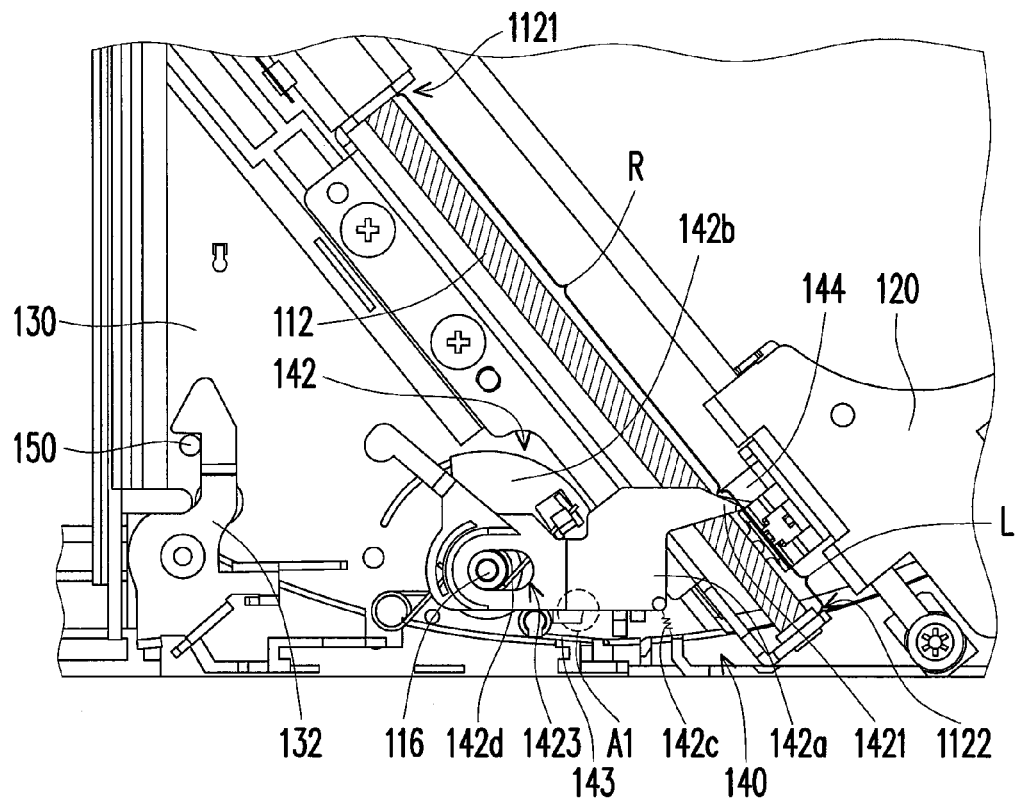
FIG. 3 is a schematic view of a tray locking device of the optical disc drive of FIG. 1.

FIG. 1 is a three dimensional view of an optical disc drive of an embodiment of the invention. FIG. 2 is a schematic view of a tray ejected from the optical disc drive of FIG. 1. FIG. 3 is a schematic view of a tray locking device of the optical disc drive of FIG. 1. Referring to FIG. 1 to FIG. 3, an optical disc drive 100 of the present embodiment includes an outer casing 110, an optical head 120, a tray 130, a lead screw 112 and a tray locking device 140. The optical head 120 is engaged to the lead screw 112 in such a way that when the lead screw 112 rotates, the lead screw 112 drives the optical head 120 to move relatively on the lead screw 112. The tray 130 is movably disposed inside the outer casing 110, and has a locking position (as shown in FIG. 1) and an ejection position (as shown in FIG. 2).

The tray locking device 140 of the present embodiment includes a transmission assembly 142, a pushing member 144 and a latching hook 132. The latching hook 132 is pivoted on the tray 130, and is adapted to latch and release a pin 150, in order to lock and release the tray 130. The pushing member 144 is disposed on the optical head 120. The pushing member 144 and the optical head 120 can be driven to be moved by the lead screw 112. The transmission assembly 142 is disposed between the pushing member 144 and the latching hook 132, wherein the pushing member 144 pushes the transmission assembly 142 to operate, which in turn drives the latching hook 132 to rotate, such that the latching hook 132 releases the pin 150, allowing the tray 130 to be ejected from the outer casing 110.

In the embodiment of the invention, the tray locking device 140 is disposed on the tray 130, and the pin 150 is disposed on the outer casing 110. Therefore, when the latching hook 132 of the tray locking device 140 latches the pin 150, the tray 130 is locked inside the outer casing 110 as well; when the latching hook 132 releases the pin 150, the tray 130 is then ejected outside the outer casing 110.

Figure 4:
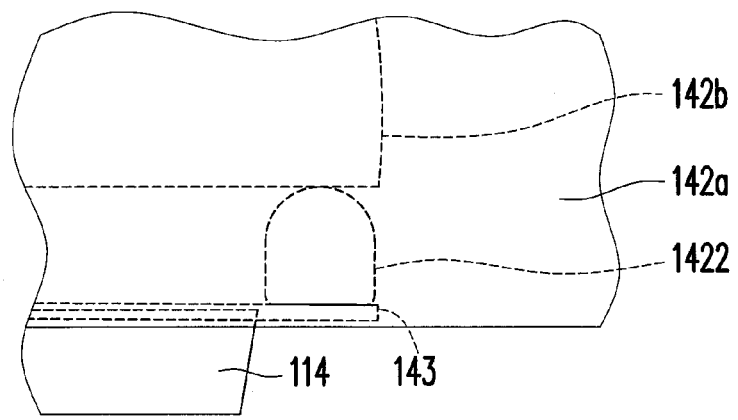
FIG. 4 is an enlarged view of an area A1 of the transmission assembly of FIG. 3.

Referring to FIG. 3 and FIG. 4, FIG. 4 is an enlarged view of an area A1 of the transmission assembly of FIG. 3. The transmission assembly 142 includes a lever element 142*a*, a weight block 142*b*, a position limiting elastic member 143 and a first stop portion 114. The lever element 142*a* has a sliding slot 1423 and a second stop portion 1422. The sliding slot 1423 is slidably and rotatably installed on a rotation axle 116. The weight block 142b is pivoted on the rotation axle 116, and leans against the second stop portion 1422. The position limiting elastic member 143 leans against the second stop portion 1422, and is used to provide an elastic force on the second stop portion 1422. The first stop portion 114 is disposed inside the tray 130. Moreover, the first stop portion 114 and the second stop portion 1422 can be coupled with each other.

The transmission assembly 142 further has a driving portion 1421. The driving portion 1421 is disposed on the motion path of the pushing member 144, and the driving portion 1421 divides the lead screw 112 into a reading segment R and a loading segment L, wherein the reading segment R falls in between the driving portion 1421 and a first end 1121 of the lead screw 112, and the loading segment L falls in between the driving portion 1421 and a second end 1122 of the lead screw 112.

When the tray 130 is to be ejected, the lead screw 112 drives the pushing member 144 to move from the reading segment R to the loading segment L, and then move back to the reading segment R, such that the pushing member 144 pushes the driving portion 1421 of the transmission assembly 142, causing the transmission assembly 142 to operate and drive the latching hook 132 to rotate so as to release the pin 150, allowing the tray 130 to be ejected from the outer casing 110.

In the present embodiment, the transmission assembly 142 further includes a plurality of elastic members 142c and 142d, which are used to provide an elastic force on the lever element 142a and the weight block 142b, and restore the transmission assembly 142 to an initial state as shown in FIG. 3.

The transmission assembly of the invention is disposed between a pushing member and a latching hook, wherein the transmission assembly is driven by the pushing member and then in turn drives the latching hook to operate. A process for unlocking the tray is explained hereinafter.

When the optical disc drive 100 is reading an optical disc 50, the lead screw 112 simultaneously drives the optical head 120 and the pushing member 144 to move within the reading segment R, i.e. to move between the first end 1121 of the lead screw 112 and the driving portion 1421. At this time, the tray 130 is locked inside the outer casing 110, and the latching hook 132 and the pin 150 are latched together as shown in FIG. 3.

Figure 5A:
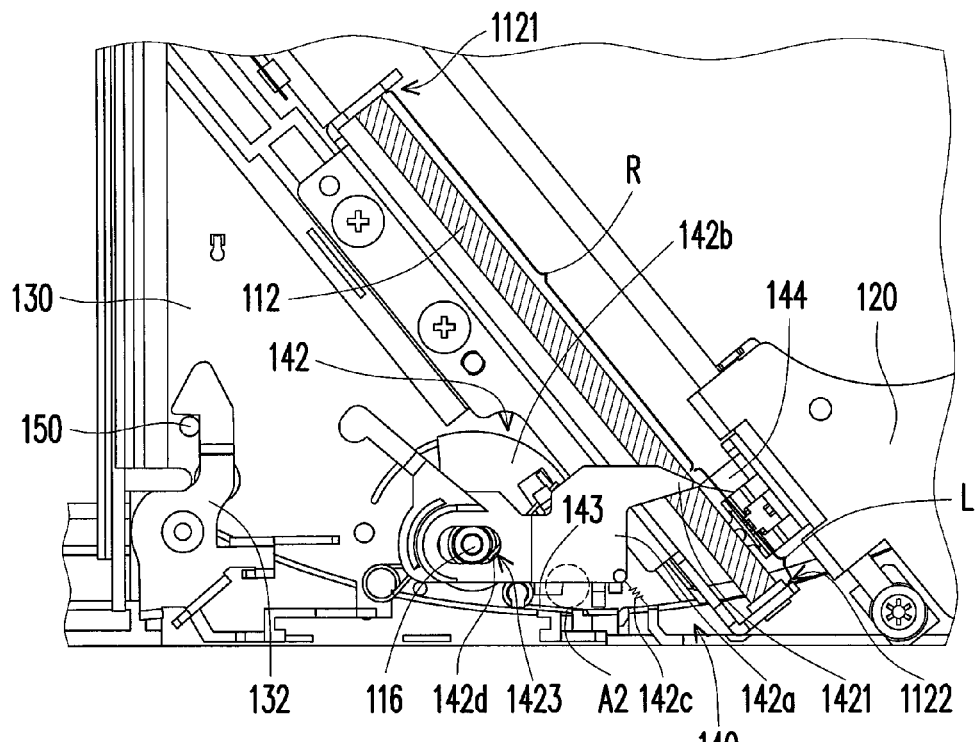
FIG. 5A to FIG. 5C show a process in which the tray locking device of FIG. 3 unlocks the tray.
Figure 5B:
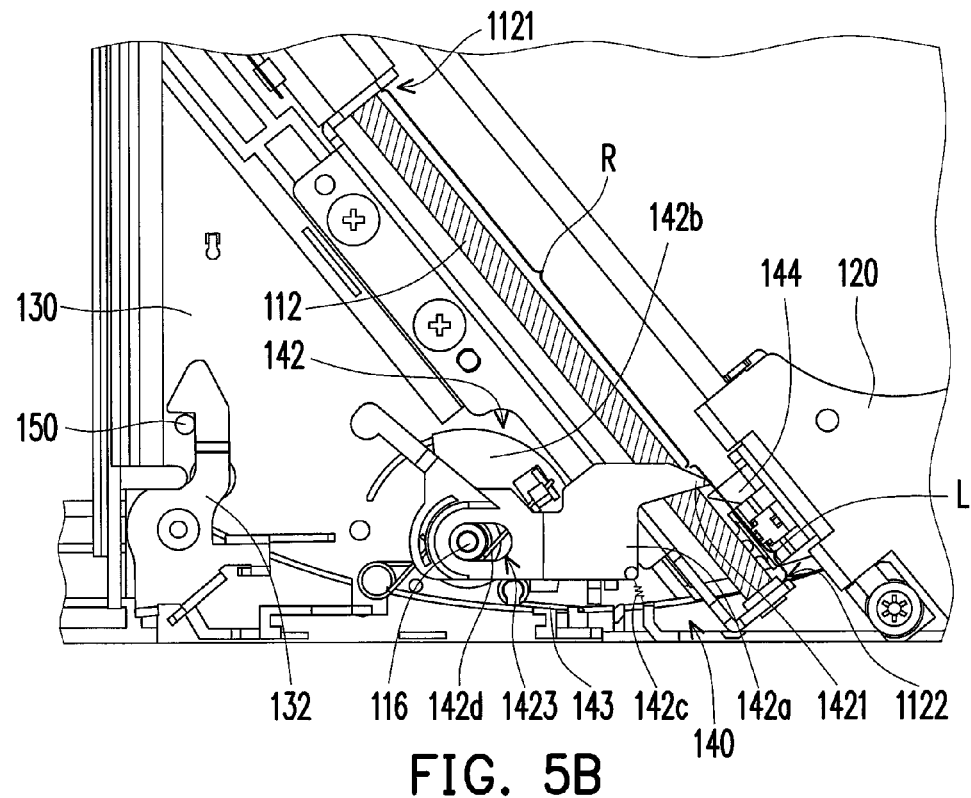
Figure 5C:
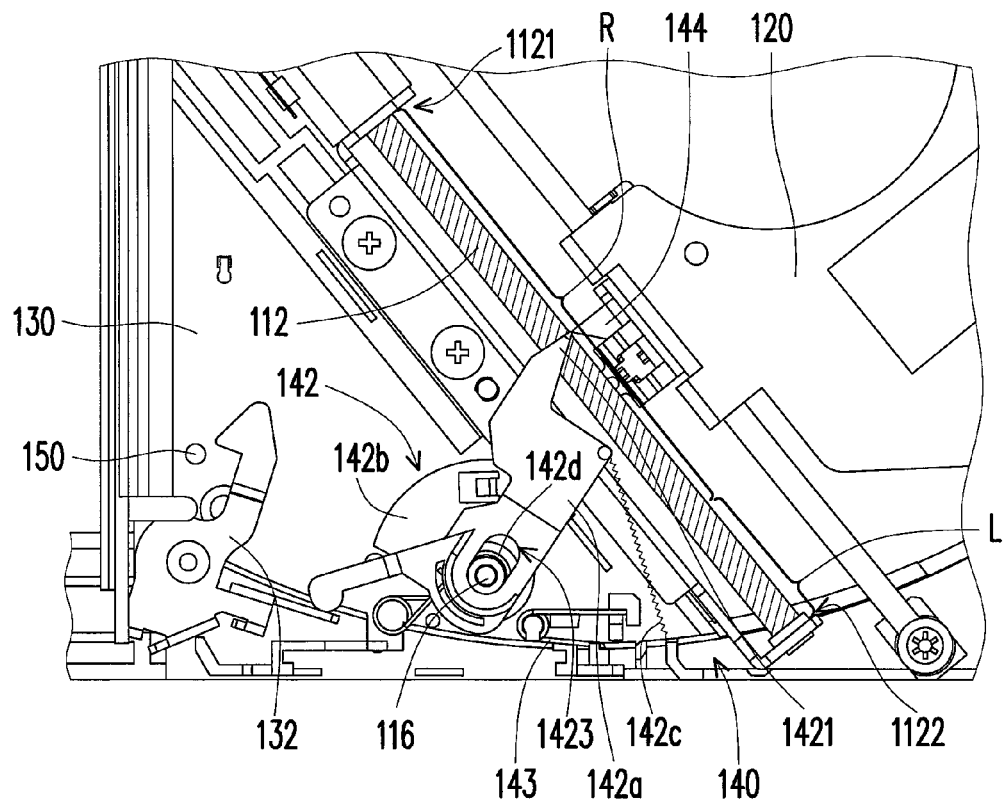
Figure 6:
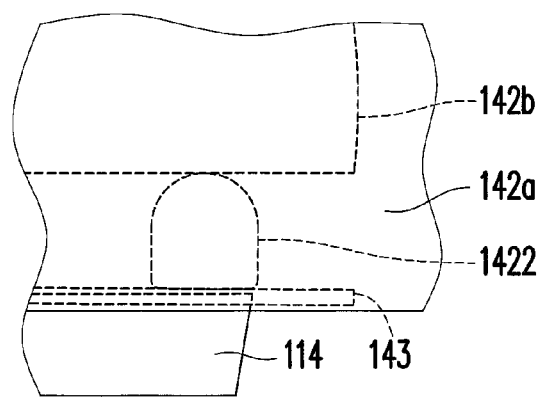
FIG. 6 is an enlarged view of an area A2 of the transmission assembly of FIG. 5A.

FIG. 5A to FIG. 5C show a process in which the tray locking device of FIG. 3 unlocks the tray 130. When the tray 130 is to be ejected from the optical disc drive 100, the lead screw 112 drives the pushing member 144 to move from the reading segment R towards the loading segment L, and pushes the lever element 142a to move relative to the rotation axle 116. As shown in FIG. 5A and FIG. 6, FIG. 6 is an enlarged image of an area A2 of the transmission assembly of FIG. 5A. When the pushing member 144 attempts to push the lever element 142a, since the position limiting elastic member 143 blocks and restricts the lever element 142a from rotating, the lever element 142a will move due to a pushing by the pushing member 144. In other words, the lever element 142a will move relative to the rotation axle 116.

Next, the pushing member 144 crosses the driving portion 1421 of the lever element 142a, and the lever element 142a is restored to an initial position due to an elastic force of the elastic member 142c, as shown in FIG. 5B. Then, the lead screw 112 drives the pushing member 144 to move towards the reading segment R, as shown in FIG. 5C. At this time, the lever element 142a is pushed by the pushing member 144 and rotates, in turn driving the latching hook 132 to release the pin 150, causing the tray 130 to be unlocked and ejected from the outer casing 110.

When the pushing member 144 again crosses the driving portion 1421 of the lever element 142a, the elastic members 142c and 142d exert an elastic force that restore the lever element 142a and the weight block 142b to an initial state, as shown in FIG. 3.

According to the tray locking device provided in the invention, the lead screw 112 not only drives the optical head 120 to move to read the optical disc 50, but also drives the pushing member 144 to push the transmission assembly 142 which in turn drives the latching hook 132 to operate so as to eject the tray 130 from the outer casing 110. In other words, space is saved inside the optical disc drive 100 by using the existing lead screw 112 to drive the tray locking device, and production cost is reduced as well.

Additionally, if the optical disc drive 100 is subjected to an impact when the optical head 120 has moved close to the loading segment L, the pushing member 144 is very likely to cross the driving portion 1421 and enter the loading segment L. At this time, when the optical head 120 is intended to be moved back to the reading segment R, the pushing member 144 will be caused to push the transmission assembly 142 to operate and accidentally unlock the tray 130 and eject it from the outer casing 110.

Figure 7:
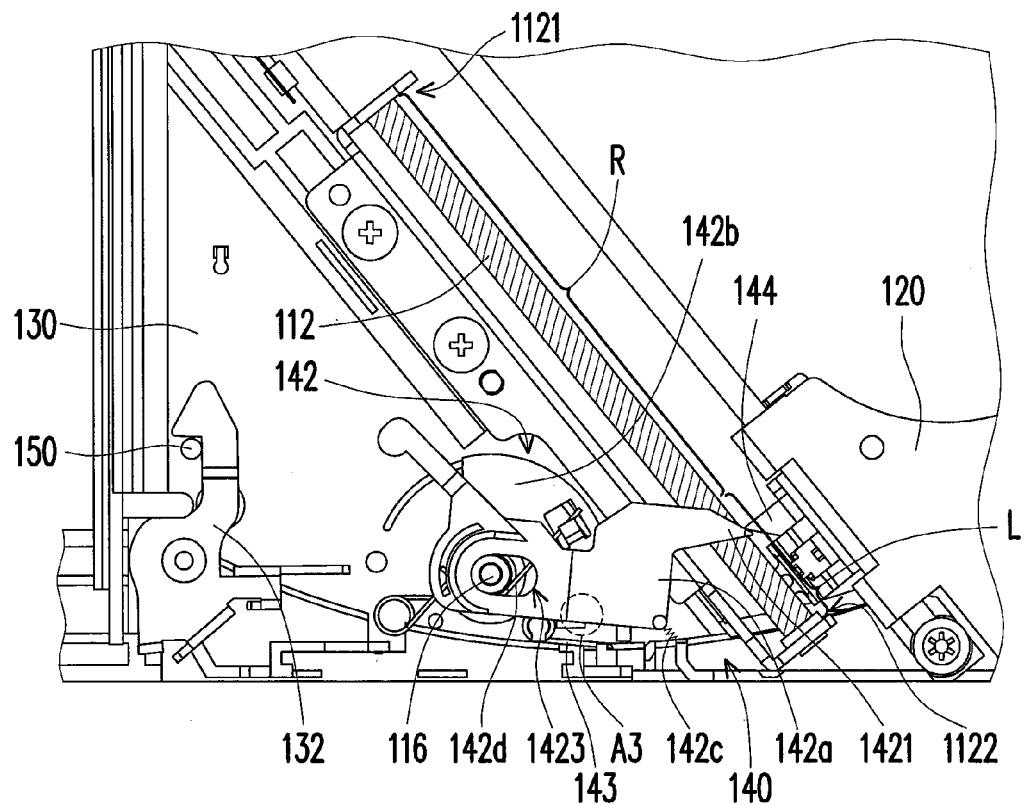
FIG. 7 is a schematic view of the tray locking device of FIG. 3 operating under an impact force.
Figure 8:
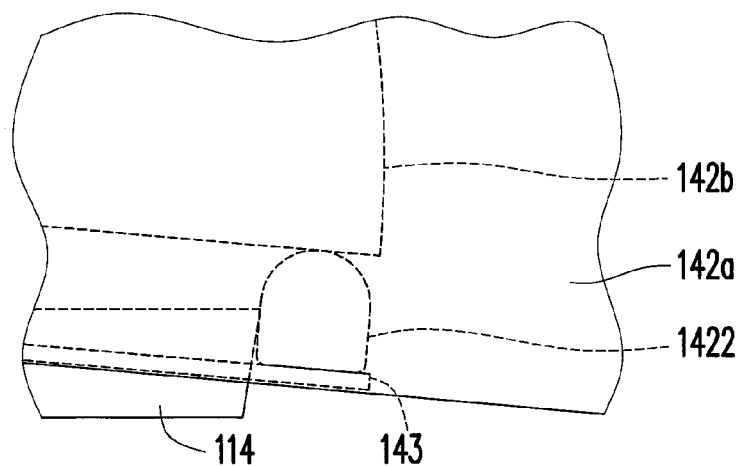
FIG. 8 is an enlarged view of an area A3 of the transmission assembly of FIG. 7.

To prevent accidental unlocking of the tray 130, the tray locking device 140 provided by the present embodiment has an impact-dealing mechanism. Please refer to FIG. 7 and FIG. 8. FIG. 7 is a schematic view of the tray locking device of FIG. 3 operating under an impact force. FIG. 8 is an enlarged image of an area A3 of the transmission assembly of FIG. 7.

When the optical disc drive 100 is subjected to an impact, the weight block 142b of the tray locking device 140 overcomes the elastic force of the position limiting elastic member 143 under the impact force, and pushes the lever element 142a to rotate, such that the second stop portion 1422 of the lever element 142a and the first stop portion 114 are coupled with each other, as shown in FIG. 8.

When the second stop portion 1422 of the lever element 142a and the first stop portion 114 are coupled with each other, the lever element 142a is unable to move relative to the rotation axle 116. Therefore, when the optical head 120 is subjected to an impact and intends to move towards the loading segment L, since the pushing member 144 is unable to push the lever element 142a to move, the pushing member 144 is unable to cross the driving portion 1421 of the lever element 142a. Using this method, the pushing member 144 can be prevented from crossing the driving portion 1421 due to an external impact, and the optical disc drive 100 can avoid accidentally unlocking the tray 130 while operating.

In summary of the above, the lead screw of the invention not only drives the optical head to read the optical disc, but also drives the tray locking device to unlock the tray, so as to eject the tray from the optical disc drive. In other words, the optical head and the tray locking device use the same lead screw, saving the space inside the optical disc drive and reducing production cost. Additionally, the tray locking device of the invention also has an impact-dealing mechanism, by equipping the weight block that pushes the lever element under an impact force, making the second stop portion of the lever element and the first stop portion coupled with each other to restrict a movement of the lever element, which in turn prevents the pushing member from crossing the driving portion of the lever element, thus preventing an accidental unlocking and ejection of the tray from the optical disc drive.

Although the invention has been disclosed in the embodiment above, it is not intended to limit the invention. It will be apparent to one of ordinary skill in the art that modifications and variations to the described embodiment may be made without departing from the spirit and scope of the invention. Therefore, the protection scope of the invention is subject to the appended claims.

What is claimed is:

1. A tray locking device of an optical disc drive, adapted to lock and release a tray, wherein the optical disc drive has an optical head engaged to a lead screw and driven to be moved by the lead screw, the tray locking device including:
   a pushing member, disposed on the optical head;
   a first stop portion, disposed on the tray;
   a latching hook, adapted to latch and release a pin; and
   a transmission assembly, disposed between the pushing member and the latching hook, and comprising a lever element and a weight block, wherein the lever element is movably disposed in the tray and has a second stop portion, and the first stop portion and the second stop portion is adapted to be coupled with each other;
   wherein when the tray is to be ejected, the pushing member pushes the lever element and enters a loading segment of the lead screw;
   wherein when the optical disc drive is subjected to an impact, the weight block pushes the lever element, such that the first stop portion and the second stop portion are coupled with each other.

2. The tray locking device of claim 1, wherein the lever element has a driving portion, and the driving portion divides the lead screw into a reading segment and the loading segment.

3. The tray locking device of claim 2, wherein the reading segment is between a first end of the lead screw and the driving portion, and the loading segment is between a second end of the lead screw and the driving portion.

4. The tray locking device of claim 1, wherein the tray locking device comprises a position limiting elastic member, wherein the position limiting elastic member leans against the second stop portion, and provides an elastic force on the second stop portion.

5. The tray locking device of claim 4, wherein when the tray is to be ejected, the position limiting elastic member restricts a rotation of the lever element, and the pushing member pushes the lever element and enters the loading segment; wherein when the optical disc drive is subjected to the impact, the weight block resists the position limiting elastic member and pushes the lever element, such that the first stop portion and the second stop portion are coupled with each other, so as to restrict a motion of the lever element and to prevent the pushing member from entering the loading segment.

6. The tray locking device of claim 1, wherein the lever element has a sliding slot, and the sliding slot is slidably and rotatably connected to a rotation axle.

7. The tray locking device of claim 6, wherein when the tray is to be ejected, the pushing member pushes the lever element to move relative to the rotation axle, and enters the loading segment; wherein when the optical disc drive is subjected to the impact, the weight block pushes the lever element to rotate relative to the rotation axle, such that the first stop portion and the second stop portion are coupled with each other.

8. The tray locking device of claim 1, wherein when the first stop portion and the second stop portion are coupled with each other, the lever element is restricted from moving.

* * * * *